Nov. 15, 1927.

C. M. WICKSTRUM 1,649,203

FOLDING CASKET TRUCK

Filed Oct. 2, 1923   2 Sheets-Sheet 1

Inventor
C. M. Wickstrum
By Philip A. H. Torell
Attorney

Nov. 15, 1927.

C. M. WICKSTRUM

FOLDING CASKET TRUCK

Filed Oct. 2, 1923

Inventor
C. M. Wickstrum
By Philip A. H. Sewell
Attorney

Patented Nov. 15, 1927.

1,649,203

UNITED STATES PATENT OFFICE.

CECIL M. WICKSTRUM, OF OMAHA, NEBRASKA.

FOLDING CASKET TRUCK.

Application filed October 2, 1923. Serial No. 666,093.

The invention relates to a foldable top used in connection with a foldable casket carriage and has for its object to provide a foldable top, which also forms a receptacle for the reception of the drapery, the cover being constructed in such a manner that when the carriage is extended the inverted cover will receive upwardly extending handles and other members carried by the carriage and will be supported by said handles and upwardly extending members in a horizontal plane for the reception of a casket.

A further object is to provide the sections forming the cover with partitions, spaced from their adjacent hinged ends, thereby forming a transversely disposed chamber when the cover is extended for the reception of oppositely disposed upwardly extending members carried centrally of the carriage.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
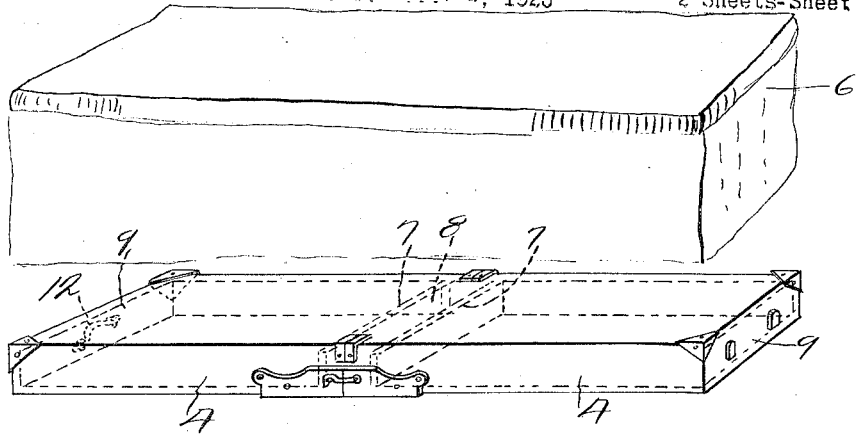
Figure 1 is a collective view showing the foldable carriage extended, the foldable cover in position to be placed on the carriage and a drapery for the foldable cover.
Figure 1:
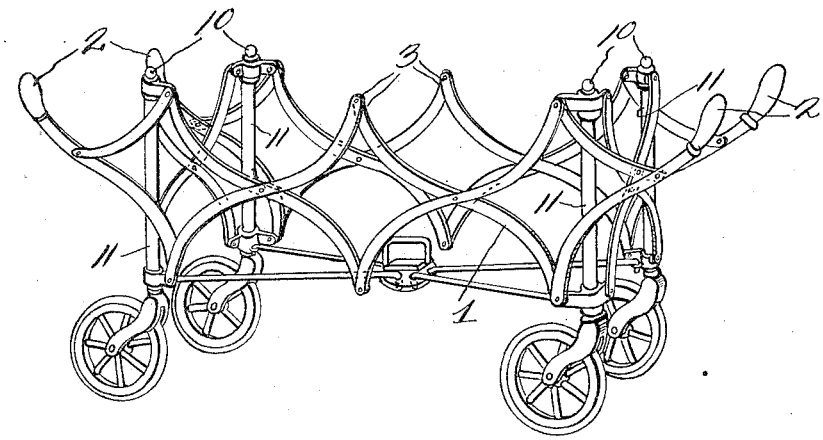
Figure 2:
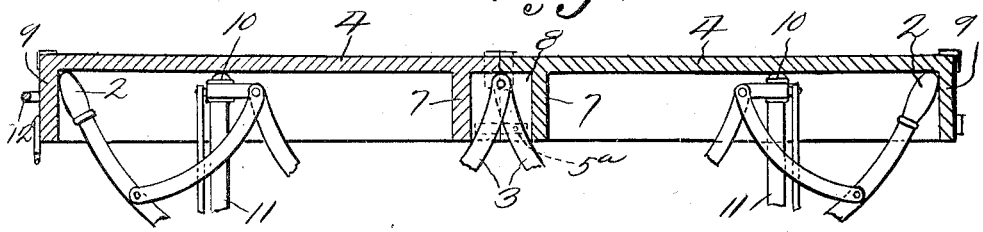
Figure 2 is a longitudinal sectional view vertically through the cover and the upper side of the foldable carriage.
Figure 4:
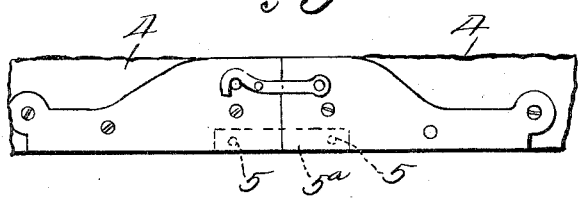
Figure 4 is an enlarged detail side elevation of one of the hinges.
Figure 5:
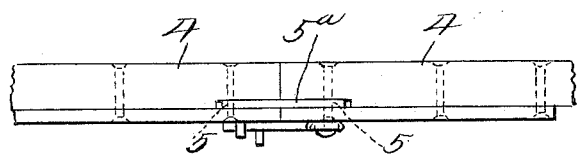
Figure 5 is a bottom plan view of one of the hinges.
Figure 3:
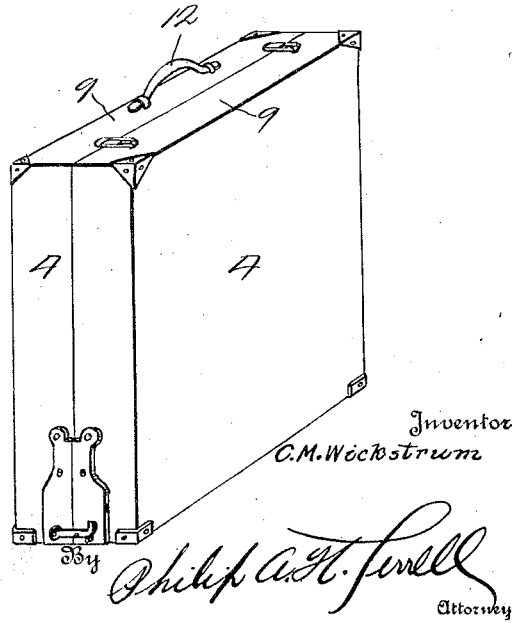
Figure 3 is a perspective view of the cover showing the same folded.

Referring to the drawing, the numeral 1 designates a conventional form of double foldable casket carriage which carriage is foldable longitudinally and transversely, and is provided with upwardly extending handle members 2 at its opposite ends and centrally disposed upwardly extending pivotally connected members 3, which are disposed at opposite sides of the carriage. The carriage cover is formed from hingedly connected sections 4, which sections are hingedly connected together at 5, preferably by a link hinge 5ª, which will allow the sections to move into abutting engagement as shown in Figure 1 or to the folded position shown in Figure 3, at which time the cover is formed into a case in which the drapery 6, for the top is carried. The adjacent hinged ends of the top section 4 are provided with transversely disposed partitions 7, which are spaced slightly from the hinged ends of the sections 4, thereby forming a transversely disposed chamber 8 for the reception of the upwardly extending members 3 and for forming the bottoms for the sections 4 and for the case as a whole, so that articles particularly the drapery 6 may be disposed within the case. The handle members 2 of the carriage engage against the ends 9 of the sections 4 and consequently in combination with the upwardly extending members 3 support the top rigidly and in a horizontal plane. The sections 4 are also supported by engagement with the upper ends 10 of the standards 11 of the carriage, thereby additionally bracing and holding the top. When the top has been positioned on the carriage the drapery 6 is then spread over the top, extending downwardly thereby furnishing a suitable drapery for the casket carriage. One of the top sections 4 is provided with a handle member 12 adapted to be grasped by the operator for carrying the case from place to place with the drapery therein.

From the above it will be seen that a foldable top is provided for a foldable casket carriage, which foldable top also forms a receptacle for the reception of the drapery 6, thereby allowing easy transportation of the device.

The invention having been set forth what is claimed as new and useful is:—

The combination with a foldable casket carriage, said casket carriage being provided with upwardly and outwardly extended spaced handle members at its ends, oppositely and centrally disposed pivoted members carried by the carriage and in the same horizontal plane as the handle members, of a foldable top for said carriage, said top comprising hingedly connected members having side and outer end walls, transversely disposed partitions carried by the hingedly connected members spaced from their adjacent hinged ends and forming a transversely disposed chamber for the reception of the centrally disposed pivoted members of the carriage.

In testimony whereof I hereunto affix my signature.

CECIL M. WICKSTRUM.